(12) United States Patent
Dawson et al.

(10) Patent No.: US 8,380,837 B2
(45) Date of Patent: Feb. 19, 2013

(54) SOFTWARE LICENSE MANAGEMENT WITHIN A CLOUD COMPUTING ENVIRONMENT

(75) Inventors: Christopher J. Dawson, Arlington, VA (US); Yu Deng, Yorktown Heights, NY (US); Rick A. Hamilton, II, Charlottesville, VA (US); Jenny S. Li, Danbury, CT (US); Liangzhao Zeng, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 12/876,337

(22) Filed: Sep. 7, 2010

(65) Prior Publication Data
US 2012/0059917 A1 Mar. 8, 2012

(51) Int. Cl.
*G06F 15/173* (2006.01)
(52) U.S. Cl. ........ 709/223; 709/200; 709/202; 709/224; 709/226; 709/229
(58) Field of Classification Search .................. 709/200, 709/202, 223, 224, 226, 229
See application file for complete search history.

(56) References Cited

U.S. PATENT DOCUMENTS

| | | | |
|---|---|---|---|
| 5,671,412 A | 9/1997 | Christiano | |
| 7,565,325 B2 | 7/2009 | Lenard et al. | |
| 7,636,693 B2 | 12/2009 | Faur et al. | |
| 2004/0010440 A1 | 1/2004 | Lenard et al. | |
| 2007/0061393 A1* | 3/2007 | Moore | 709/201 |
| 2008/0083025 A1 | 4/2008 | Meijer et al. | |
| 2008/0083040 A1 | 4/2008 | Dani et al. | |
| 2008/0091613 A1 | 4/2008 | Gates et al. | |
| 2009/0222505 A1 | 9/2009 | Pavan et al. | |
| 2010/0332271 A1* | 12/2010 | De Spong | 705/7 |
| 2011/0185064 A1* | 7/2011 | Head et al. | 709/226 |
| 2011/0238737 A1* | 9/2011 | Agrawal et al. | 709/203 |
| 2012/0016721 A1* | 1/2012 | Weinman | 705/7.35 |

OTHER PUBLICATIONS

Mell et al., "The NIST Definition of Cloud Computing", National Institute of Standards and Technology, Information Technology Laboratory, Version 15, Oct. 7, 2009, 2 pages.
Maitland, J., "Keeping Control Isn't Easy", Chapter 4: Cloud-Based Infrastructure, SearchCloudComputing.com, 13 pages.

* cited by examiner

*Primary Examiner* — Liangche A Wang
(74) *Attorney, Agent, or Firm* — William E. Schiesser; Keohane & D'Alessandro, PLLC

(57) ABSTRACT

Embodiments of the present invention provide a solution to manage software licenses within a cloud computing environment. Specifically, aspects of the present invention (among other things): determine a requester's/customer's needs; identify a set (at least one) of providers capable of addressing the requester's licensing needs; and match the customer with the most appropriate provider. The embodiments of the present invention will also analyze current licensing configurations/models of the requesters, providers, and software vendors to identify areas of potential improvement. This provides the functionality necessary to adjust software license level in a dynamic fashion so as to best meet the customer's needs.

16 Claims, 6 Drawing Sheets

SOFTWARE LICENSE MANAGEMENT WITHIN A CLOUD COMPUTING ENVIRONMENT

TECHNICAL FIELD

The present invention generally relates to software licensing. Specifically, the present invention relates to software license management within a cloud computing environment.

BACKGROUND

The cloud computing environment is an enhancement to the predecessor grid environment, whereby multiple grids and other computation resources may be further abstracted by a cloud layer, thus making disparate devices appear to an end-user as a single pool of seamless resources. These resources may include such things as physical or logical compute engines, servers and devices, device memory, and storage devices.

Under a cloud computing environment, licenses play an integral role in obtaining software/services. As known, licensing can involve complex issues. For example, from a service provider's perspective the decision whether to purchase an enterprise license can play an integral role in customer growth planning. From a customer's perspective the decision on price and duration of licenses can play an integral role in overall business and cash flow planning (among other areas). Currently, limitations exist for methods to accurately gauge the needs of providers and potential customers, match customers to the most appropriate providers, and fine tune license scenarios/configurations to best fit both parties' needs.

SUMMARY

Embodiments of the present invention provide a solution to manage software licenses within a cloud computing environment. Specifically, aspects of the present invention (among other things): determine a requester's/customer's needs; identify a set (at least one) of providers capable of addressing the requester's licensing needs; and match the customer with the most appropriate provider. The embodiments of the present invention will also analyze current licensing configurations/models of the requesters, providers, and software vendors to identify areas of potential improvement. This provides the functionality necessary to upgrade and downgrade software license usage in a dynamic fashion A first aspect of the present invention provides a method for managing software licenses within a cloud computing environment, comprising: receiving a request for a cloud service from a requester; gathering information related to the request; identifying a set of providers capable of fulfilling the request; matching the requester with a particular provider of the set of providers based on the information; analyzing a set of current license configurations of the particular provider and the requester to identify a set of potential improvements to the set of current license configurations; and providing output based on the matching and the analyzing.

A second aspect of the present invention provides a system for managing software licenses within a cloud computing environment, comprising: a bus; a processor coupled to the bus; and a memory medium coupled to the bus, the memory medium comprising instructions to: receive a request for a cloud service from a requester; gather information related to the request; identify a set of providers capable of fulfilling the request; match the requester with a particular provider of the set of providers based on the information; conduct an analysis of a set of current license configurations of the particular provider and the requester to identify a set of potential improvements to the set of current license configurations; and provide output based on the match and the analysis.

A third aspect of the present invention provides a computer program product for managing software licenses within a cloud computing environment, the computer program product comprising a computer readable storage media, and program instructions stored on the computer readable storage media, to: receive a request for a cloud service from a requester; gather information related to the request; identify a set of providers capable of fulfilling the request; match the requester with a particular provider of the set of providers based on the information; conduct an analysis of a set of current license configurations of the particular provider and the requester to identify a set of potential improvements to the set of current license configurations; and provide output based on the match and the analysis.

A fourth aspect of the present invention provides a method for deploying a system for managing software licenses within a cloud computing environment, comprising: deploying a computer infrastructure being operable to: receive a request for a cloud service from a requester; gather information related to the request; identify a set of providers capable of fulfilling the request; match the requester with a particular provider of the set of providers based on the information; conduct an analysis of a set of current license configurations of the particular provider and the requester to identify a set of potential improvements to the set of current license configurations; and provide output based on the match and the analysis.

BRIEF DESCRIPTION OF THE DRAWINGS

These and other features of this invention will be more readily understood from the following detailed description of the various aspects of the invention taken in conjunction with the accompanying drawings in which.

Figure 1:
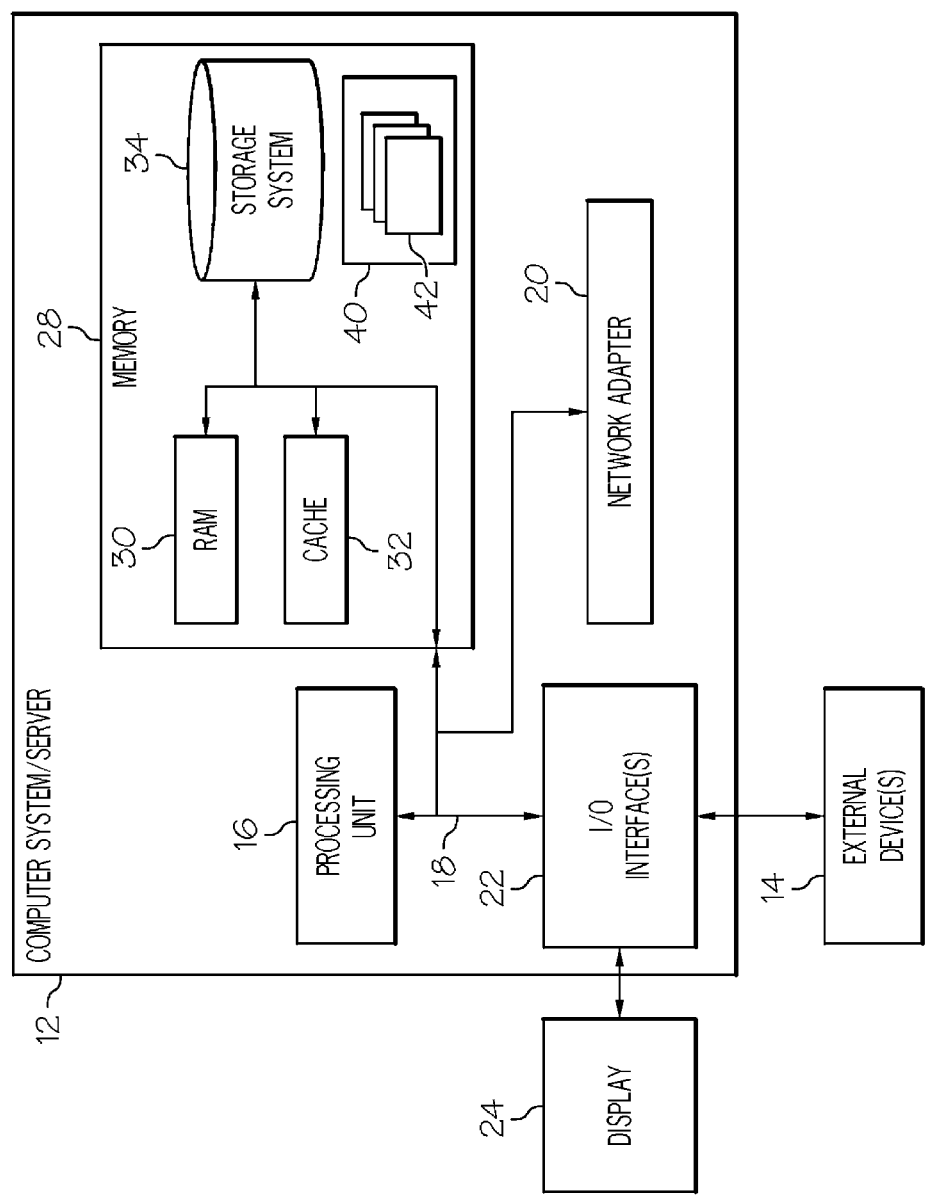
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide a solution to manage software licenses within a cloud computing environment. Specifically, aspects of the present invention (among other things): determine a requester's/customer's needs; identify a set (at least one) of providers capable of addressing the requester's licensing needs; and match the customer with the most appropriate provider. The embodiments of the present invention will also analyze current licensing configurations/models of the requesters, providers, and software vendors to identify areas of potential improvement. This provides the functionality necessary to adjust software license level in a dynamic fashion so as to best meet the customer's needs.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing unit 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
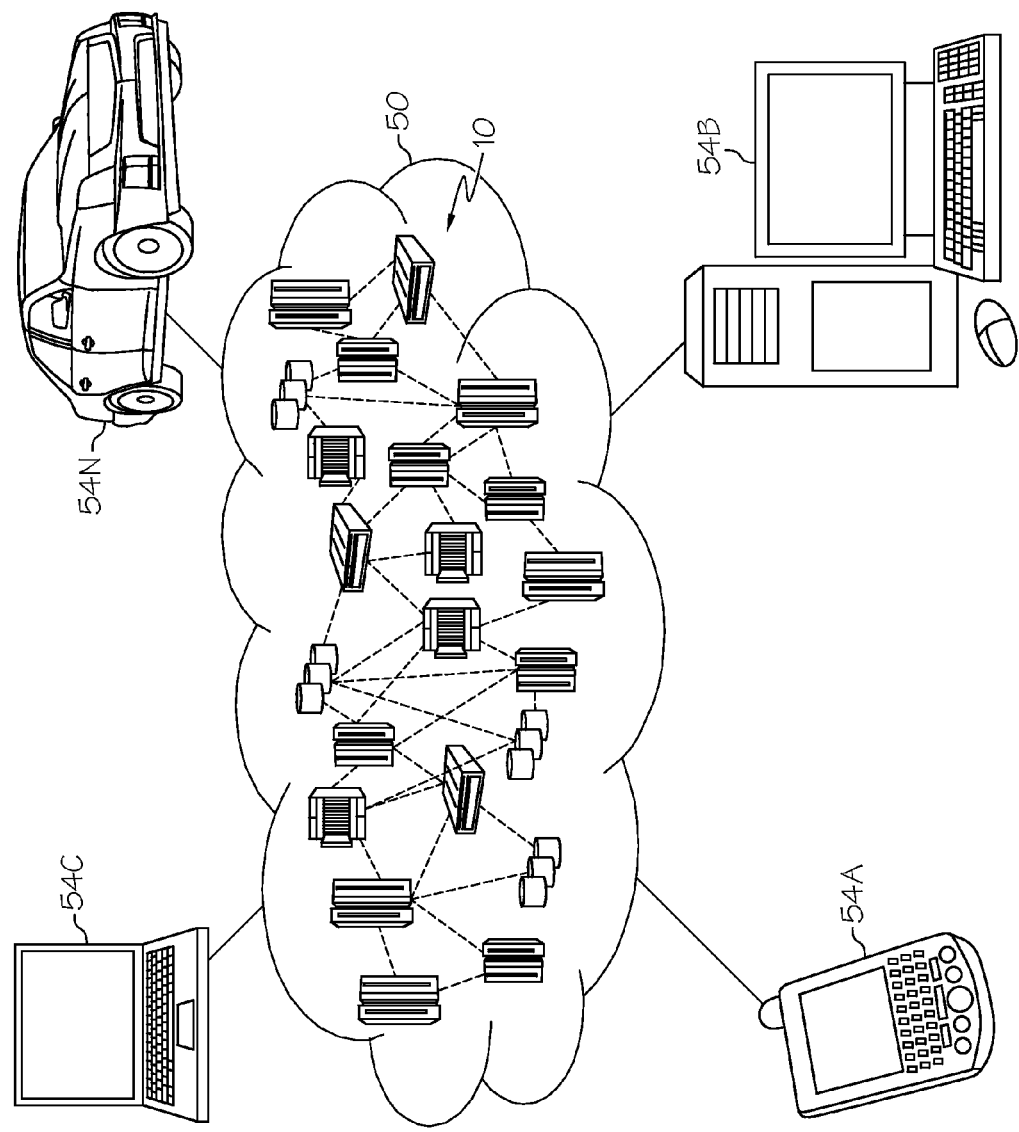
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
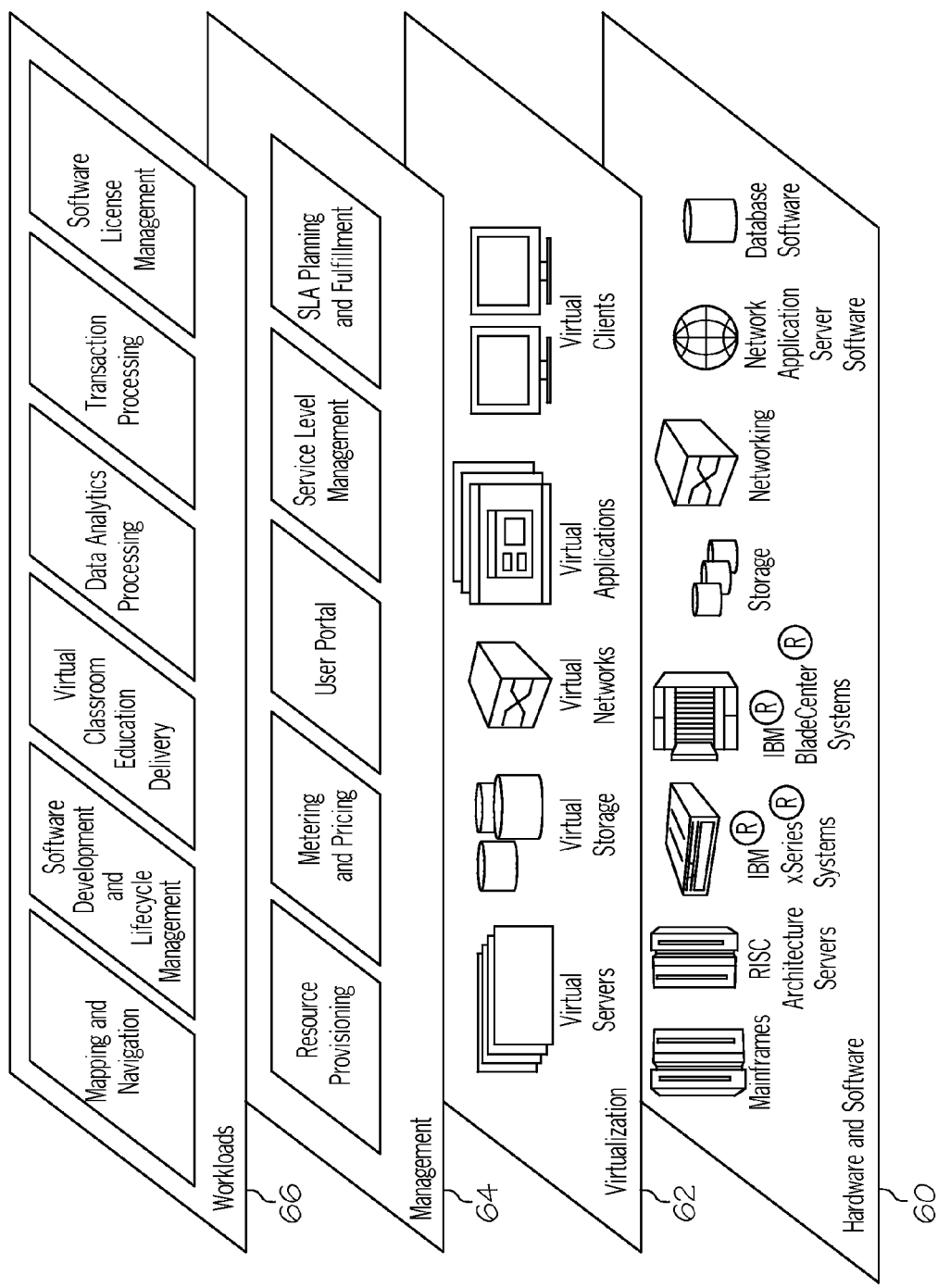
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and software license management. As mentioned above, all of the foregoing examples described with respect to FIG. 3 are illustrative only, and the invention is not limited to these examples.

It is understood all functions of the present invention as described herein are typically performed by the software license management function, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description of cloud computing, implementation of the teachings recited herein are not limited to a cloud computing environment. Rather, the embodiments of the present invention are intended to be implemented with any type of clustered computing environment now known or later developed.

Figure 4:
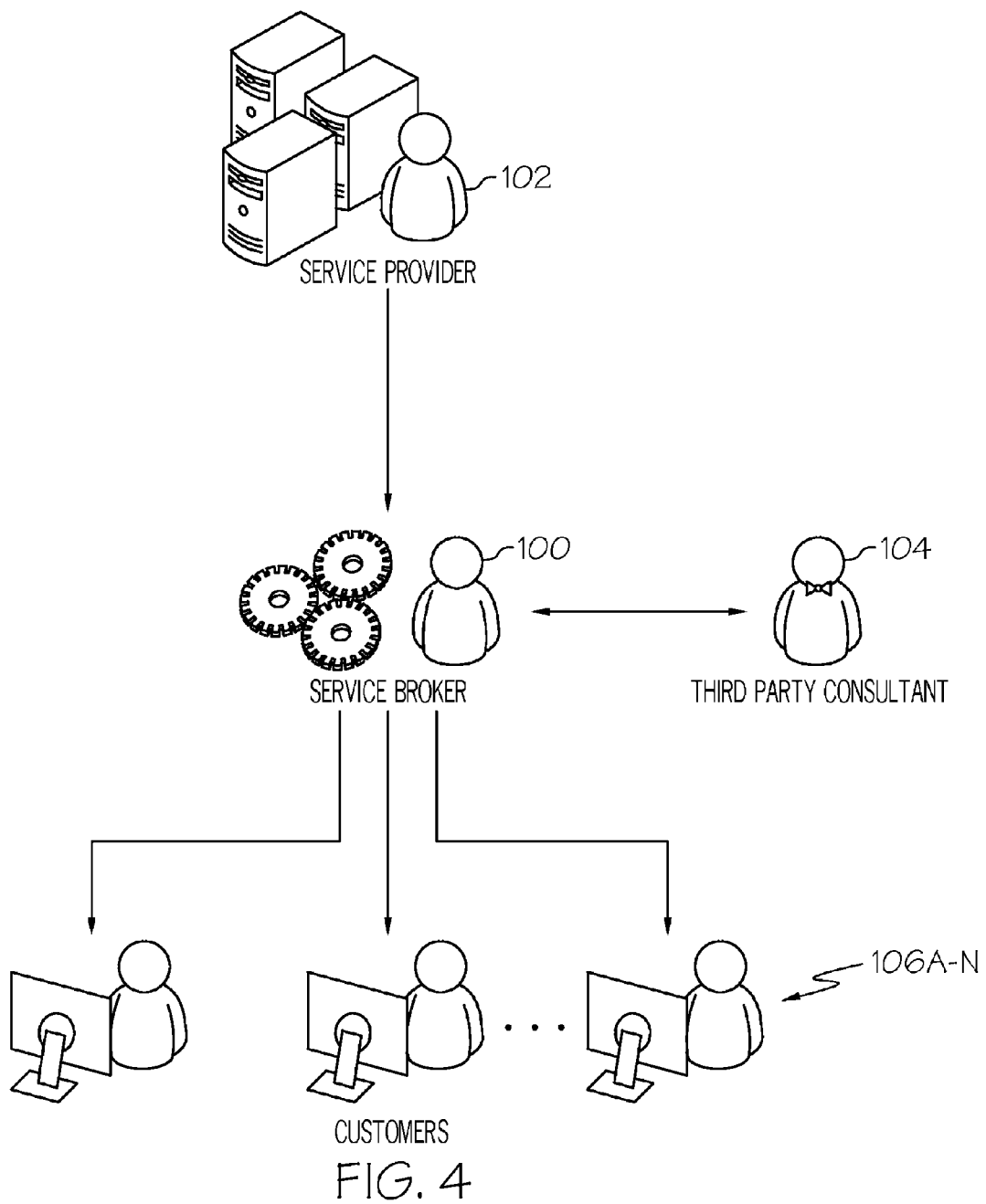
FIG. 4 depicts a diagram depicting the management of software licenses

Referring now to FIG. 4, a diagram depicting the management of software licensing according to the present invention is shown. As shown, FIG. 4 depicts a service broker 100, a cloud service provider (hereinafter provider 102), customers (also referred to as requesters) 106A-N, and a third party consultant 104. In a typical embodiment, service broker 100 receives input from cloud customers, provider 102, and third party consultant(s) 104. In general, service broker 100 acts as a point of contact to manage license requirements for both customer 106A-N and provider 102. One responsibility of provider 102 is to provide a simplified infrastructure for the customers so that the customer 106A-N does not require extensive knowledge infrastructure set-up and maintenance. Provider 102 minimizes the effort of the customer 106A-N to get the customer 106A-N's applications running efficiently in the cloud computing environment.

Among other things, the service broker 100's responsibility can include:

(1) Gathering the customer 106A-N's requirements for each application used (e.g., does the user have any license for the application; if the customer 106A-N is bringing in his/her own license, how many concurrent users would be accessing the application; is the license restricted by the number of physical machines, or installations; and/or how many instances of the image does the user need; etc.)?

(2) Gathering information on the license options and services provided by the provider(s) 102.

(3) Performing match-making of the license options provided by the provider 102 against the customer 106A-N's needs (e.g., can the cloud provider's existing licenses satisfy the end user's needs). Along these lines, broker 100 would answer questions such as: If the provider 102's license is overbroad (say the user needs a simple license and the service provider provides an enterprise license), can the customer 106A-N purchase a cheaper license from the software application company and bring his own license to the environment); and/or does the customer 106A-N needs five separate licenses or should he/she purchase a bulk license instead?

(4) Consulting the third party consultant 104 for additional input on licensing and pricing trends (optional). The third party consultant 104's responsibility is to provide expert advice to broker 100 regarding the best fit of the licensing that the customer 106A-N would need for running a particular software application. Along these lines, third party consultant 104 can comprise a software product provider. Third party consultant 104 may analyze the market and current and past requirements of the customer. Based on such analysis, broker 100 may suggest that a provider 102 change their licensing structure to better meet requirements of customers.

(5) Creating a recommendation to the customer 106A-N regarding: which provider 102 to use; what licenses customer 106A-N should purchase; and configurations/models for acquiring the licenses (e.g., if he purchases a license from a service provider, brings his/her own license, or brings his/her own license and needs to pay for upgrade license fees, etc.). The recommendation can also be addressed to the provider 102 to suggest an update of their licenses to suit the majority of their customer 106A-N's demands.

Figure 5:
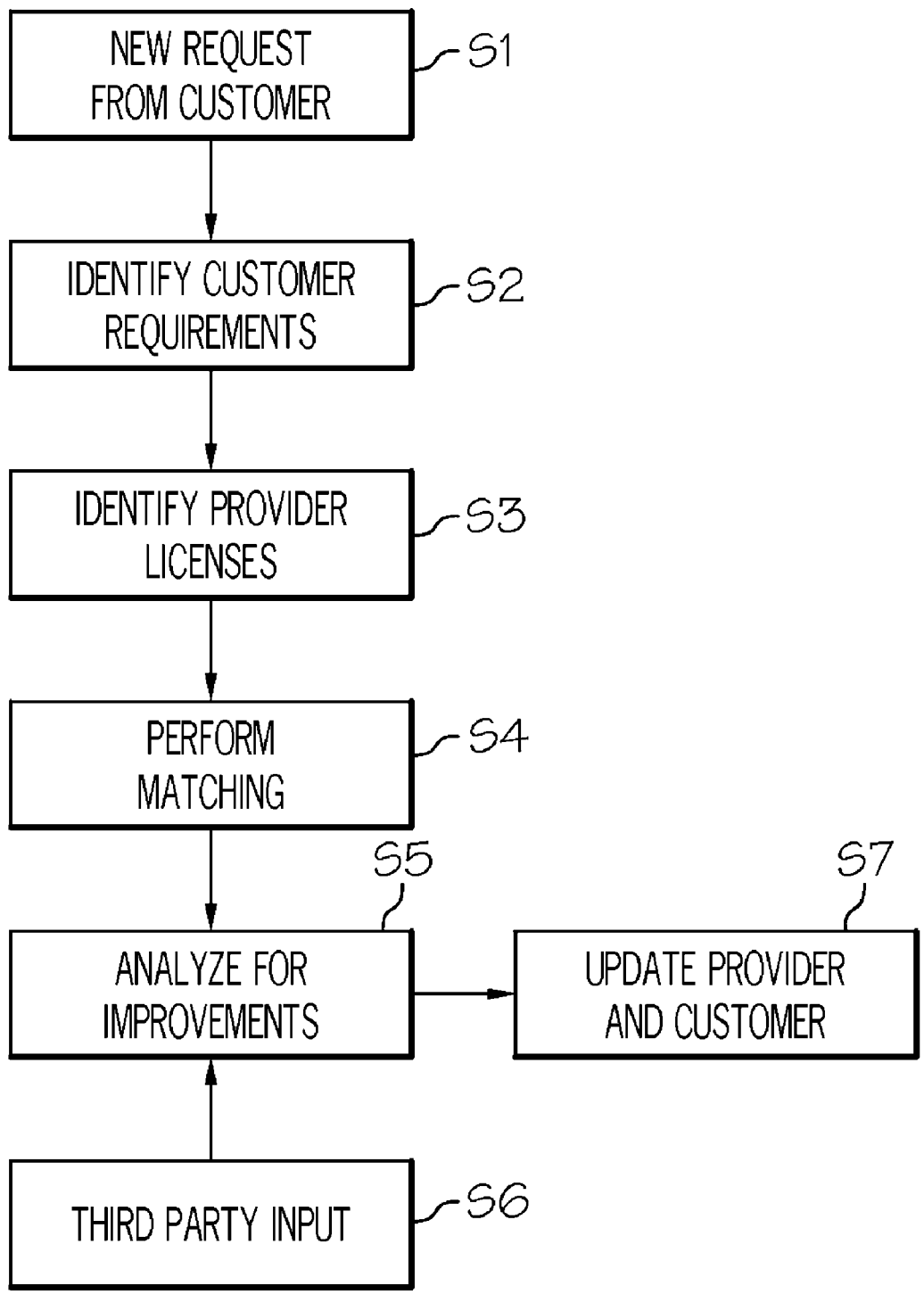
FIG. 5 depicts a method flow diagram according to an embodiment of the present invention.
Figure 6:
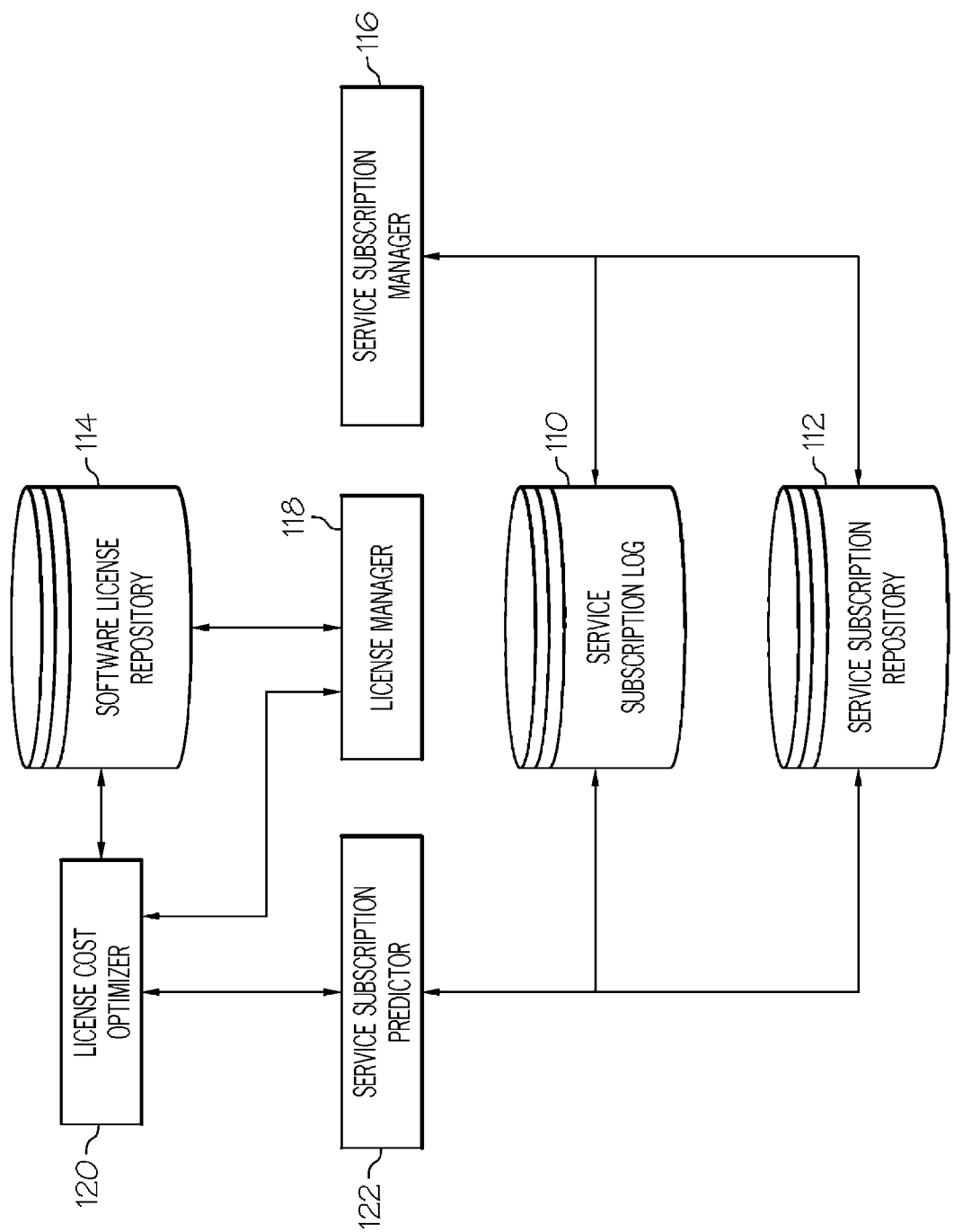
FIG. 6 depicts an architectural diagram according to an embodiment of the present invention.

These concepts can be further explained in conjunction with the method flow diagram of FIG. 5 and the architectural diagram of FIG. 6. It is understood that the components shown in FIG. 6 could be part of or utilized by the broker. In step S1, a request is made by a requester (e.g., customer 106A-N of FIG. 4) for a cloud service. Rather than selecting a specific provider, the customer makes the request to the license broker with details of the request. In step S2, information (such as customer requirements and existing licenses) is gathered (e.g., by service subscription manager 116) from service subscription log 110 and/or service subscription repository 112. In a typical embodiment, service subscription manager 116 manages all subscriptions in which service subscription log 110 logs such information about customer, services subscribed to, SLA, etc., and service subscription repository 112 provides details about current service subscription. Regardless, the identification of any licenses that the customer already has may be useful when determining the provider to choose. For example, the customer may be requesting a database service but unknowingly already has a database license that could be used.

In step S3, a set (at least one) of providers that is able to fulfill the service request made by the customer is identified. This is typically performed by license manager component 118, which analyzes current provider licenses in software license repository 114. Specifically, software license repository 114 provides details (e.g., costs) on software licenses that the provider/operator owns. Such licenses are managed by license manager 118. Once identified, the broker examines the current offered services, the price and any licenses that the cloud will provide in order to fulfill the request. For example, provider 'A' may be able to offer a database service at a high price because it comes with a server side license. Cloud provider 'B' may be able to offer a similar service at a cheaper price as long as the customer provides the license.

In step S4, the broker (e.g., license manager 118, license cost optimizer, and/or service subscription predictor 122) performs a matching operation to identify a particular broker that best meets the customer's needs. Specifically, once the broker has the necessary information, the broker is able to make a determination as to which provider should be used and whether or not the customer should leverage a user side license. Along these lines, the broker will look at the cost for the customer to utilize their own license against the higher cost of a provider, which offers a license as part of the service. It also looks at whether a license can be 'upgraded' or 'downgraded' to ensure that the customer will have an appropriate license level. For example, the customer may already have an adequate user license while the provider has only a 'professional' license. In this case, it may be possible for the provider to lower the cost of the service and have the customer use their own license.

In step S5, license cost optimizer 120 and/or service subscription predictor 122 analyzes current license configurations/models of the provider and/or the customer to identify potential improvements thereto. Specifically, license cost optimizer 120 optimizes the type and quantity of licenses that a service operator possesses, while service subscription predictor 122 predicts additional subscription types, their costs, etc. Because the broker is able to determine the demand from customers, available services from providers, and has input from current licensing charge models, the broker is able to make recommendations on whether the customer, provider, and/or the software vendor should change their license configurations. For example, if the broker finds that the customer is consistently not using a certain user license, then the broker may elect to inform the customer that he or she no longer requires the license. Conversely, it may suggest that the customer procure a user license for a certain period of time because it knows that the license can be used with less expensive providers where no server side license is in place. Such improvements can be suggested to the software vendors, the provider and/or the customer.

Regardless, shown in step S6 is the ability to receive third party input. Specifically, the broker may also consult with third party consultant(s) (e.g., analysts) to identify trends and patterns in license usage. This information could be useful for (among other things) matching customers and brokers, recommending license configurations, future license planning, and/or etc.

In step S7 output is generated in the form of an update to the provider and/or customer. Such output can inform the parties (e.g., on a periodic basis) as to how efficient they are with their license usage, how they may adjust their license configurations for optimal cost-benefit, etc.

While shown and described herein as a software license management solution, it is understood that the invention further provides various alternative embodiments. For example, in one embodiment, the invention provides a computer-readable/useable medium that includes computer program code to enable a computer infrastructure to provide software license management functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide software license management functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for software license management. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/ driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for managing software licenses within a cloud computing environment, comprising:
   receiving a request for a cloud service from a requester;
   gathering information related to the request;
   identifying a set of providers capable of fulfilling the request;
   matching the requester with a particular provider of the set of providers based on the information;
   receiving third party input corresponding to trends in current license usage through the cloud computing environment;
   analyzing, based on the third party input, a set of current license configurations of the particular provider and the requester to identify a set of potential improvements to the set of current license configurations; and
   providing output based on the matching and the analyzing.

2. The method of claim 1, the gathering comprising accessing a service subscription log and the information comprising a set of current licenses held by the requester.

3. The method of claim 1, the identifying comprising accessing a software license repository.

4. The method of claim 1, the output being provided to the requester and the particular provider.

5. The method of claim 1, the set of potential improvements relating to at least one of the following: a proposed duration for a new license, a proposed termination of an existing license, or a proposed change to an existing license.

6. A system for managing software licenses within a cloud computing environment, comprising:
   a bus;
   a processor coupled to the bus; and
   a memory medium coupled to the bus, the memory medium comprising instructions to:
      receive a request for a cloud service from a requester;
      gather information related to the request;
      identify a set of providers capable of fulfilling the request;
      match the requester with a particular provider of the set of providers based on the information;
      receive third party input corresponding to trends in current license usage through the cloud computing environment;
      conduct an analysis, based on the third party input, of a set of current license configurations of the particular provider and the requester to identify a set of potential improvements to the set of current license configurations; and
      provide output based on the match and the analysis.

7. The system of claim 6, the memory medium further comprising instructions to access a service subscription log to gather the information, and the information comprising a set of current licenses held by the requester.

8. The system of claim 6, the memory medium further comprising instructions to access a software license repository to identify the set of providers.

9. The system of claim 6, the output being provided to the requester and the particular provider.

10. The system of claim 6, the set of potential improvements relating to at least one of the following: a proposed duration for a new license, a proposed termination of an existing license, or a proposed change to an existing license.

11. A computer program product for managing software licenses within a cloud computing environment, the computer program product comprising a non-transitory computer readable storage media, and program instructions stored on the computer readable storage media, to:
   receive a request for a cloud service from a requester;
   gather information related to the request;
   identify a set of providers capable of fulfilling the request;
   match the requester with a particular provider of the set of providers based on the information;
   receive third party input corresponding to trends in current license usage through the cloud computing environment;
   conduct an analysis, based on the third party input, of a set of current license configurations of the particular provider and the requester to identify a set of potential improvements to the set of current license configurations; and
   provide output based on the match and the analysis.

12. The computer program product of claim 11, further comprising program instructions stored on the non-transitory computer readable storage media to access a service subscription log to gather the information, and the information comprising a set of current licenses held by the requester.

13. The computer program product of claim 11, further comprising program instructions stored on the non-transitory computer readable storage media to access a software license repository to identify the set of providers.

14. The computer program product of claim 11, the output being provided to the requester and the particular provider.

15. The computer program product of claim 11, the set of potential improvements relating to at least one of the following: a proposed duration for a new license, a proposed termination of an existing license, or a proposed change to an existing license.

16. A method for deploying a system for managing software licenses within a cloud computing environment, comprising:

deploying a computer infrastructure being operable to:

receive a request for a cloud service from a requester;

gather information related to the request;

identify a set of providers capable of fulfilling the request;

match the requester with a particular provider of the set of providers based on the information;

receive third party input corresponding to trends in current license usage through the cloud computing environment;

conduct an analysis, based on the third party input, of a set of current license configurations of the particular provider and the requester to identify a set of potential improvements to the set of current license configurations; and provide output based on the match and the analysis.

* * * * *